United States Patent [19]
Koelbel et al.

[11] 3,739,212
[45] June 12, 1973

[54] DEVICE FOR THE WEDGING OF COILS OF ROTORS OF ELECTRIC MACHINES

[75] Inventors: Robert Koelbel; Joseph De Vaulx; Roger Gillet, all of Belfort; Christian Lehuen, Cravanche, all of France

[73] Assignee: Societe Generale De Constructions Electriques Et Mecaniques (alsthom), Paris, France

[22] Filed: Oct. 4, 1971

[21] Appl. No.: 186,421

[30] Foreign Application Priority Data
Oct. 6, 1970 France.............................. 7036130

[52] U.S. Cl................................ 310/194, 310/269
[51] Int. Cl. ............................................. H02k 3/18
[58] Field of Search ................... 310/269, 194, 214, 310/218

[56] References Cited
UNITED STATES PATENTS
3,089,049  5/1963  Sills..................................... 310/269
2,720,605  10/1955  Herd.................................... 310/194

FOREIGN PATENTS OR APPLICATIONS
722,470  1/1955  Great Britain...................... 310/194
200,628  12/1965  Sweden............................... 310/269

Primary Examiner—D. F. Duggan
Attorney—Flynn & Frishauf

[57] ABSTRACT

The invention relates to the wedging of coils on the rotors with salient poles of electric machines with wedges put between the coils. The wedges are kept in place through studs which connect them through ball-and-socket joints to attachment pieces resting under two adjacent coils. Such a wedging is especially useful in long machines wherein the rotor is subjected to extensive heating.

3 Claims, 1 Drawing Figure

Patented June 12, 1973  3,739,212
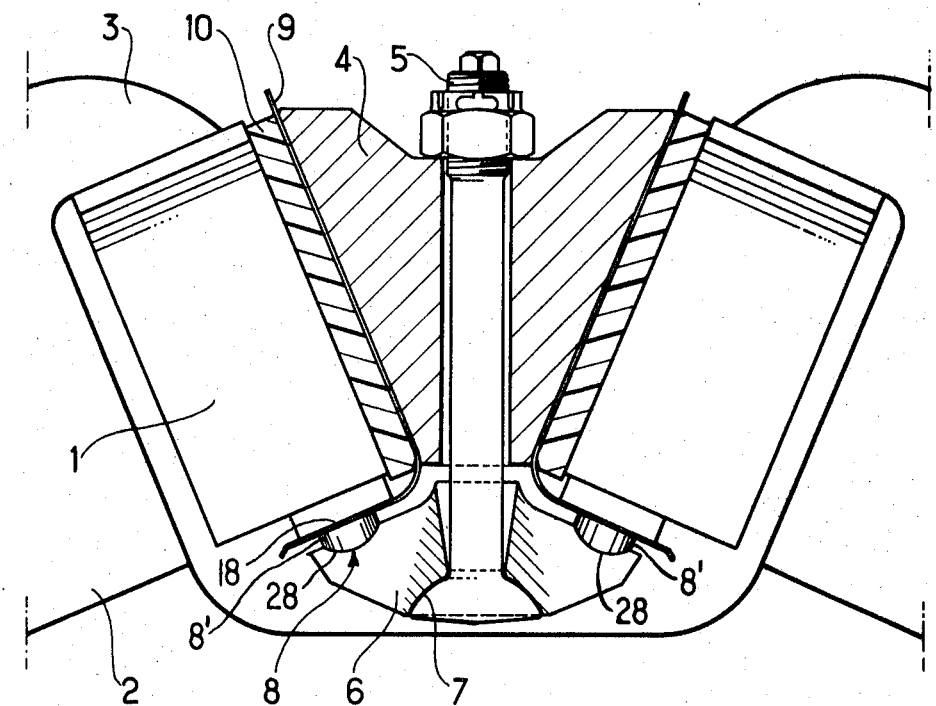

DEVICE FOR THE WEDGING OF COILS OF ROTORS OF ELECTRIC MACHINES

The invention relates to a device for the wedging of coils on rotors with salient poles of synchronous electric machines. Those rotors are generally made up of a boss and of pole pieces, or cores, upon which are put the coils. In operation, the coils are submitted to large stresses and, in the present usual structures, they are kept in position, on the one hand, by the pole cores, on the other hand, by fastening wedges put between the coils and fastened to the rotor by bolts.

There were already proposed devices for wedging coils on rotors with salient poles of electric machines, through wedges put between the coils, which wedges are kept in place through studs which connect them to attachment pieces supported under two adjacent coils while exerting upon them a radial stress towards the outside of the rotor.

SUBJECT MATTER OF THE PRESENT INVENTION

Briefly, we found that it was necessary in the long machines with rotors subjected to extensive heating, to allow a free expansion of the inductive coils by connecting, according to a first feature of the invention, each stud to the corresponding attachment piece through a ball-and-socket joint. That structure can be still improved if, according to another feature of the invention, the attachment pieces are supported under the coils also through ball-and-socket joints.

The FIGURE of the drawing shows an examplary embodiment of the invention.

In the device shown, coils 1 are put on polar cores 2 at the ends of which are the pole pieces, or heads 3. Between the coils 1 are put fastening wedges 4, which are kept in place by being connected through studs 5 to an attachment piece 6 which is supported under the coils 1 while exerting upon them a radial stress towards the outside of the rotor. Each stud 5 is connected to the attachment piece 6 through a ball-and-socket joint 7, and this attachment piece is supported under the coils 1 also through ball-and-socket joints 8, formed of a short cylindrical element 8' having a plane end face 18 on one side and a spherical end 28 on the other, fitting into a similarly spherical depression in member 6. The ball-and-socket joints allow the fastening wedges 4 to rest squarely on insulating packing-pieces 10 which transmit the stresses to the coils and to take the right position axially in relation to the coils. Sheets 9 for guiding the cooling fluid can be inserted between the insulating packing-pieces and the wedges.

The advantage of that structure is to that it allows the wedges of the rotor to follow freely the shiftings of the coils, mainly those due to the thermal expansion; Bending stresses, sometimes uncontrollable, in the studs are eliminated. Friction due to movement between the insulating packing-pieces, the coils and the interpolar wedges, which it was often quite difficult to reduce to acceptable levels, especially on long machines, is avoided.

We claim:

1. In a salient pole dynamo electric machine, a device for wedging coils on the rotors, comprising
    wedges (4) placed between the coils (1);
    attachment pieces (6) located beneath two adjacent coils;
    studs (5) connecting the wedges (4) and the attachment pieces (6) to secure them together while exerting upon them radial stress toward the outside of the rotor.
    the improvement comprising
    a ball and socket joint (7) connecting the corresponding attachment piece (6) and the stud (5).

2. In the machine of claim 1, a second ball and socket joint (8) located between the attachment pieces (6) and the coils (1).

3. In the machine of claim 2, an intermediate support element (8') located between the coil (1) and the corresponding attachment piece (6), said intermediate element and said attachment piece, at their matching surfaces, being formed with said second ball and socket joint (8).

* * * * *